June 17, 1924.
R. B. SIMONS
1,497,743
ADJUSTING SCREW FOR CLUTCH SHOES
Filed Nov. 7, 1921
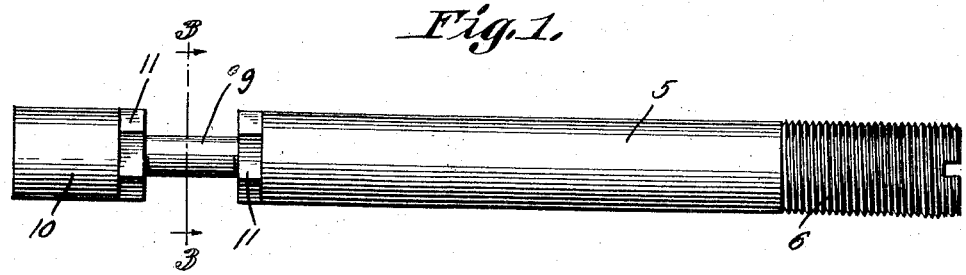
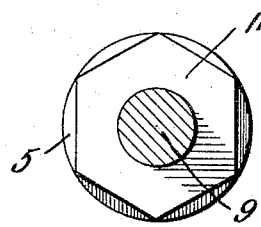
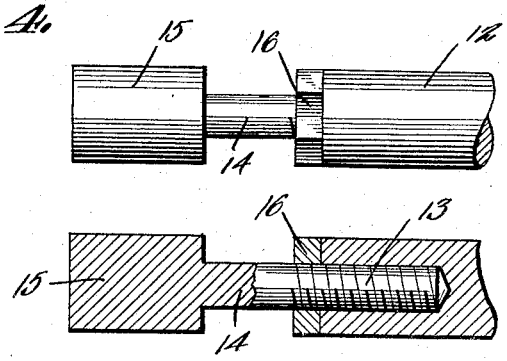
R. B. Simons,
Inventor, Patented June 17, 1924.

1,497,743

UNITED STATES PATENT OFFICE.

ROY B. SIMONS, OF BEGGS, OKLAHOMA.

ADJUSTING SCREW FOR CLUTCH SHOES.

Application filed November 7, 1921. Serial No. 513,505.

*To all whom it may concern:*

Be it known that I, Roy B. Simons, a citizen of the United States, residing at Beggs, in the county of Okmulgee and State of Oklahoma, have invented a new and useful Adjusting Screw for Clutch Shoes, of which the following is a specification.

This invention relates to stud bolts, and more particularly to an adjustable screw designed for use in connection with shoes of clutch mechanisms, the primary object of the invention being to provide a sectional screw or bolt, wherein it is only necessary to replace a portion thereof, if the same becomes broken or otherwise rendered inoperative.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view of a bolt constructed in accordance with the present invention.

Figure 2 is a longitudinal sectional view through the same.

Figure 3 is a sectional view taken on line 3—3 of Figure 1.

Figure 4 is a fragmental detail view of a modified form of the invention.

Figure 5 is a sectional view through the same.

Referring to the drawing in detail, the body portion of the device is indicated at 5, and as shown, provided with a threaded portion 6 extending from one end thereof, whereby the screw may be positioned and secured in place.

The screw is provided with a threaded bore indicated at 7, extending from the opposite end thereof and adapted to accommodate one of the threaded extremities of the bolt 9, the opposite end of the bolt 9 being threaded in the head 10, suitable locking nuts 11 being provided on the bolt 9 to lock the bolt 9 in position.

From the foregoing it will be seen that a space is provided between the nuts 11 to accommodate a suitable arm or the like, which may connect with the screw. In the form of the invention as illustrated by Figure 4 of the drawing, the screw which is indicated at 12 is formed with a bore to accommodate the threaded extremity 13 of the screw 14, which is provided with a head 15, a nut lock 16 being also provided in this showing for locking the screw 14 to the body portion 12 of the screw.

Thus it will be seen that when an arm or similar element is connected to the screw 9 or 14, the strain is brought to bear thereon, relieving the body portion of the strain so that if the screw breaks, the break will occur at the screw 9 or 14, at a point where the same enters the body portion associated therewith.

Due to this construction, it is only necessary to remove the remaining portion of the screw and substitute a new section in lieu thereof, thus eliminating the necessity of replacing the entire screw.

Having thus described the invention, what is claimed as new is:

An adjustable screw for clutch shoes, including a body portion having a threaded bore in one end thereof, a bolt having its ends threaded, a head having a threaded bore positioned on one of the threaded ends of the bolt, the opposite threaded end of the bolt being positioned in the threaded bore of the body portion, said bolt adapted to be adjusted with respect to the body portion and head, and locking means on the threaded portions of the bolt for locking the head and body portion against movement with respect to the bolt.

In testimony that I claim the foregoing as my own, I have hereto affixed my signature in the presence of two witnesses.

ROY B. SIMONS.

Witnesses:
 John Bartels,
 F. S. Garrisen.